(12) United States Patent
Anvekar et al.

(10) Patent No.: US 6,603,968 B2
(45) Date of Patent: Aug. 5, 2003

(54) ROAMING IN WIRELESS NETWORKS WITH DYNAMIC MODIFICATION OF SUBSCRIBER IDENTIFICATION

(75) Inventors: Dinesh Kashinath Anvekar, Edison, NJ (US); Bhaskarpillai Gopinath, Watchung, NJ (US); Rajendra Gupta, Mumbai (IN); Rajiv Mangla, New Delhi (IN); Abhinav Mathur, Delhi (IN); Phani Kumar Velide, Somerset, NJ (US)

(73) Assignee: Level Z, L.L.C., Piscataway, NJ (US)

( * ) Notice: Subject to any disclaimer, the term of this patent is extended or adjusted under 35 U.S.C. 154(b) by 39 days.

(21) Appl. No.: 09/888,351

(22) Filed: Jun. 22, 2001

(65) Prior Publication Data

US 2002/0197991 A1 Dec. 26, 2002

(51) Int. Cl.⁷ ................................................. H04Q 7/20
(52) U.S. Cl. ...................................... 455/432; 455/435
(58) Field of Search ................................ 455/432, 433, 455/435, 405

(56) References Cited

U.S. PATENT DOCUMENTS

| | | | |
|---|---|---|---|
| 5,657,373 A | | 8/1997 | Hermansson et al. |
| 5,675,628 A | | 10/1997 | Hokkanen |
| 5,722,067 A | * | 2/1998 | Fougnies et al. ........ 379/114.2 |
| 5,933,785 A | | 8/1999 | Tayloc |
| 5,999,811 A | | 12/1999 | Molne |
| 6,044,269 A | * | 3/2000 | Talagery ................. 455/433 |
| 6,092,133 A | | 7/2000 | Erola et al. |
| 6,148,197 A | | 11/2000 | Bridges et al. |
| 6,259,925 B1 | * | 7/2001 | Josse ................... 455/466 |
| 6,453,162 B1 | * | 9/2002 | Gentry .................. 455/414 |

* cited by examiner

Primary Examiner—Nguyen T. Vo
Assistant Examiner—Nghi H. Ly

(57) ABSTRACT

A technique to register a roaming cell-phone in a visiting location as a local phone. The technique involves identifying roaming-related information from the roaming cell-phone in the visiting location, and then dynamically configuring the roaming cell-phone to operate as a local cell-phone in the visiting location.

15 Claims, 16 Drawing Sheets

| HOME LOCATION PHONE NUMBER 710 | HOME LOCATION MSISDN 720 | HOME LOCATION IMSI 730 | CURRENT LOCATION MSISDN 740 | CURRENT LOCATION RSPN IDENTITY 750 |
|---|---|---|---|---|
| 1-800-345-7890 | 111-33-11223 | 222-33-12345678 | 111-33-11223 | 67890 |
| 1-800-333-5555 | 111-33-55667 | 222-33-87654321 | 222-55-55555 | 54321 |

630

R1 → (row 1)
R2 → (row 2)

FIG. 7A

| HOME LOCATION PHONE NUMBER 710 | HOME LOCATION MSISDN 720 | HOME LOCATION IMSI 730 | CURRENT LOCATION MSISDN 740 | CURRENT LOCATION RSPN IDENTITY 750 |
|---|---|---|---|---|
| 1-800-345-7890 | 111-33-11223 | 222-33-12345678 | 333-44-55555 | 12345 |
| 1-800-333-5555 | 111-33-55667 | 222-33-87654321 | 222-55-55555 | 54321 |

| RSPN IDENTITY 810 | MSISDN 820 |
|---|---|
| 12345 | a) 555-44-12345<br>b) 555-44-98765 |
| 54321 | a) 666-67-23456<br>b) 666-67-34567<br>c) 666-67-45678 |
| 67890 | a) 111-33-24680<br>b) 111-33-13579 |

645

R1 → (row 1)
R2 → (row 2)
R3 → (row 3)

| MSISDN 910 | IMSI 920 | IMSI AVAILABILITY 930 | ROAMING PHONE HOME LOCATION MSISDN 940 |
|---|---|---|---|
| 333-44-55555 | 122-33-12345678 | FREE | - |
| 333-44-66666 | 122-33-87654321 | FREE | - |

R1 → first row, R2 → second row; table 640

FIG. 9B

| MSISDN 910 | IMSI 920 | IMSI AVAILABILITY 930 | ROAMING PHONE HOME LOCATION MSISDN 940 |
|---|---|---|---|
| 333-44-55555 | 122-33-12345678 | ALLOCATED | 111-33-11223 |
| 333-44-66666 | 122-33-87654321 | FREE | - |

R1 → first row, R2 → second row; table 640

| WIRELESS NETWORK IDENTITY 1110 | | MSISDN FOR RSPN 1140 |
|---|---|---|
| MCC 1120 | MNC 1130 | |
| 259 | 12 | a) 555-44-12345<br>b) 555-44-98765 |
| 152 | 34 | a) 444-55-12345<br>b) 444-55-12346<br>c) 444-55-99999 |

ROAMING IN WIRELESS NETWORKS WITH DYNAMIC MODIFICATION OF SUBSCRIBER IDENTIFICATION

BACKGROUND OF THE DISCLOSURE

1. Field of the Invention

This invention relates generally to wireless networks and, more particularly, to a methodology and a concomitant system whereby a cell-phone in a roaming area is configured with the operational characteristics of a local cell-phone while in a roaming area.

2. Description of the Background Art

Roaming of cell-phone users in areas covered by different network operators is possible because of roaming agreements between the various cellular system operators. If a cell-phone with home network A is to be used in network B, then a roaming agreement between the operators of networks A and B is necessary. When the cell-phone is taken into the coverage area of network B, it is registered and calls to and from it are allowed by a mobile switching center of network B. Later, the call charge incurred by the cell-phone while it was roaming under network B is settled with the billing authority of network A. Generally, the cost of calls incurred by a cell-phone is higher when it is being used in a visiting network area. Such costs are significantly higher when roaming area is in a distant country other than the home country of the cell-phone. It is desirable to minimize the cost of calls while roaming in an area other than the home location. Keeping this in view, a method of minimizing call costs in a roaming area by dynamically changing the identity of the cell-phone to behave like a local phone is described in this invention.

As the subject matter in accordance with the present invention involves the programming of the Subscriber Identification Module (SIM) used in the Global System for Mobile (GSM) systems, relevant details of the SIM required for understanding the embodiments of this invention are now given.

The specification of GSM, the European Digital Cellular System for Land Mobile Radio Communications, defines that all the information elements needed by a radio system to identify, authenticate and locate a mobile subscriber will be contained in a dedicated SIM module, which is removable and can be used in different mobile stations. The remaining part of the mobile station, called a mobile equipment (ME), is intended to contain all the mechanisms and devices which are needed to access the GSM services (for instance, the radio equipment) but are not specific to a given subscriber. Furthermore, the SIM is removable from the mobile equipment and the interface between the subscriber identity module and the mobile equipment is standardized in ETSI specification GSM 11.11. This interface is in accordance with ISO standards on IC cards (ISO 7816).

As noted above, GSM systems use a SIM-card that stores user identities and other user specific information and thereby enables access to the service of the radio system. Only a combination of the SIM and the ME makes an operative mobile station (MS) for GSM system. The same SIM card may be used in any GSM mobile equipment ME.

Representative of art pertaining to the inventive subject matter is U.S. Pat. No. 5,657,373 ('373) issued to Hermansson et al and entitled "Digital mobile telephone system in which each subscriber is assigned a telephone number and several subscriber identity module (SIM) cards." In '373, a digital mobile communication system comprises a switching center (MSC), a subscriber register (HLR) connected thereto, mobile terminals, such as mobile telephones, and subscriber-linked subscriber's cards, such as smart cards. Each subscription is allocated a subscriber's number and at least two subscriber's cards are adapted to be activated so as to open a mobile terminal to incoming as well as outgoing traffic when inserted therein. When one of the subscriber's cards is activated, the other card or cards are necessarily deactivated so as to open a mobile terminal only to outgoing traffic when inserted therein. The subscriber register (HLR) is adapted to control the activation and the deactivation of the cards by the order of the subscriber. This reference '373 has the shortcoming of requiring the user to change the SIM cards for activation of a mobile telephone to operate with the other SIM cards. Moreover, the additional SIM cards are not usable by other users. Such a method is not suitable for roaming users, as they have to obtain the SIM cards for each of the roaming areas they plan to visit.

Thus the art is devoid of a generic method of minimizing call costs in a roaming area by dynamically changing the identity of the cell-phone to behave like a local phone.

SUMMARY OF THE INVENTION

These shortcomings and other limitations and deficiencies are obviated in accordance with the present invention by a method, and concomitant circuitry, to register a roaming phone in a visiting location as a local phone.

In accordance with the broad method aspect of the present invention, a method for operating a roaming cell-phone includes: (a) determining roaming-related information from the roaming cell-phone in a roaming area; and (b) dynamically configuring the roaming cell-phone to operate as a local cell-phone in the roaming area with reference to the roaming-related information.

In accordance with yet another broad method aspect of the present invention, a method for operating a roaming cell-phone includes: (a) registering the phone using home roaming-related information about the cell-phone in a roaming area; and (b) dynamically re-registering the phone using local roaming-related information for the cell-phone in the roaming area with reference to the home roaming-related information.

In accordance with still another broad method aspect of the present invention, a method for registering a roaming cell-phone as a local cell-phone includes: (a) identifying a roaming service provider node serving the roaming cell-phone; (b) sending to the roaming service provider node from the roaming phone a message containing cell-phone identification information about the roaming phone; (c) transmitting to the roaming phone from the roaming service provider node a response message containing a local number for establishing a call between the roaming phone and a visiting location mobile switching center; (d) communicating the local number to the visiting location mobile switching center from the roaming phone; and (e) enabling the roaming phone to operate as a local cell-phone in the visiting location with the local number.

In accordance with a broad system aspect of the present invention, the system for operating a roaming cell-phone comprises: (a) means for determining roaming-related information from the roaming cell-phone in a roaming area; and (b) means for dynamically configuring the roaming cell-phone to operate as a local cell-phone in the roaming area with reference to the roaming-related information.

BRIEF DESCRIPTION OF THE DRAWINGS

The teachings of the present invention can be readily understood by considering the following detailed description in conjunction with the accompanying drawings, in which:

FIG. 7A illustrates the entries into the Roaming Phone Number Mapping Database while the visiting phone is in the home location;

FIG. 7B illustrates the entries into the Roaming Phone Number Mapping Database after the roaming phone has registered in the visiting location as a local phone;

FIG. 8 illustrates entries into the Roaming Service Provider Node—Mobile Subscriber Integrated Services Digital Network Number directory;

FIG. 9A illustrates entries in the roaming phone International Mobile Subscriber Identity database before allocation of a local Mobile Subscriber Integrated Services Digital Network Number—International Mobile Subscriber Identity number pair;

FIG. 9B illustrates entries in the roaming phone International Mobile Subscriber Identity database after allocation of a local Mobile Subscriber Integrated Services Digital Network—International Mobile Subscriber Identity numbers pair;

FIG. 11 illustrates entries in the Roaming Service Provider Node directory;

To facilitate understanding, identical reference numerals have been used, where possible, to designate identical elements that are common to the figures.

DETAILED DESCRIPTION

To fully appreciate the import of the global cellular system of the present invention, as well as to gain an appreciation for the underlying operational principles of the present invention, it is instructive to first present, in overview fashion, a high-level description of a conventional system for establishing and maintaining a cellular phone call. This overview also serves to introduce terminology so as to facilitate the more detailed description of illustrative embodiments in accordance with the present invention. Following this overview, an elucidation of the illustrative embodiments is presented.

Conventional System and its Operation

Figure 1:
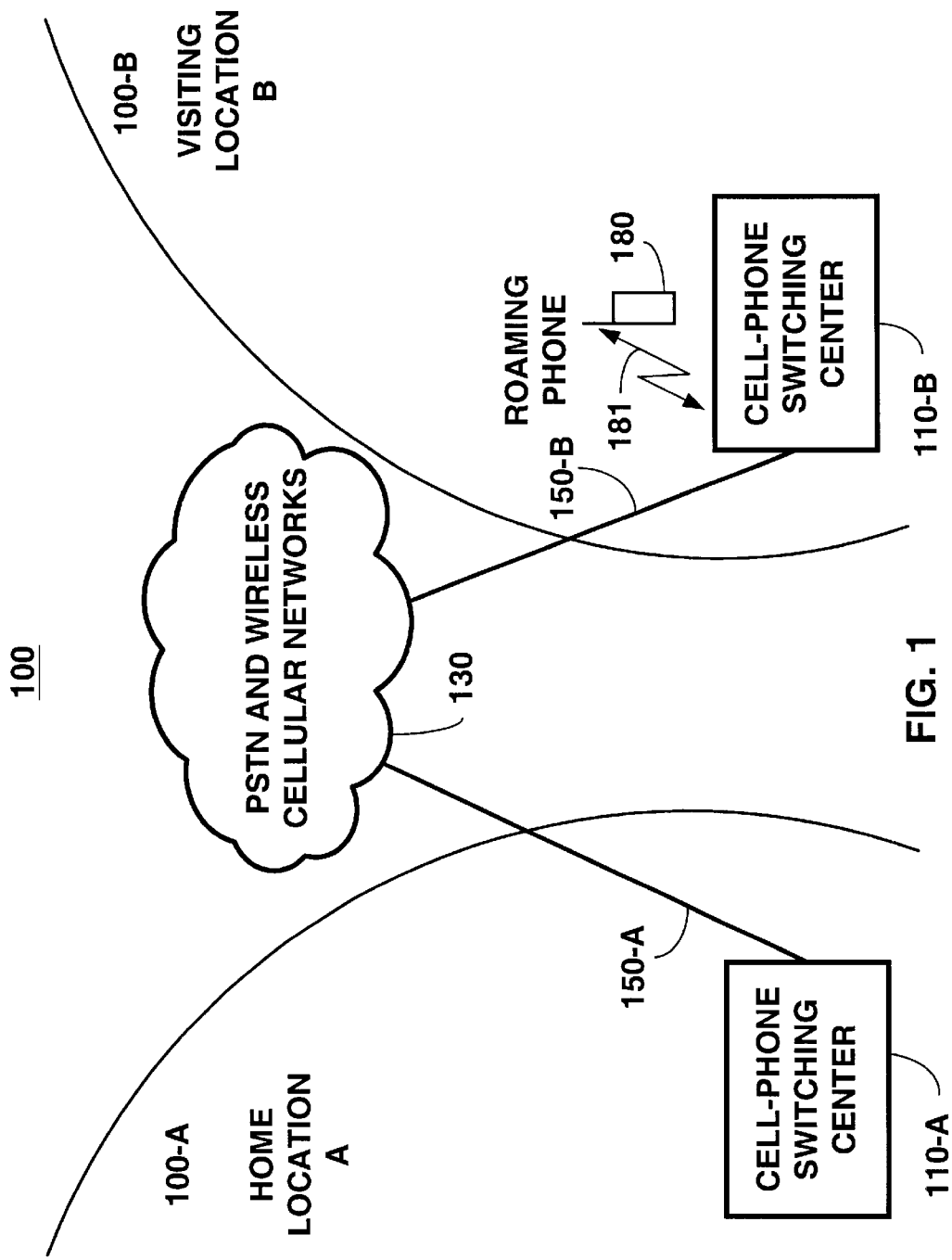
FIG. 1 is a high-level block diagram of a wireless global roaming system (e.g., a GSM system) used to describe the conventional cellular communication.

A high-level block diagram of a wireless global roaming system 100 (e.g., a GSM system) to describe the conventional manner of cellular communication is shown in FIG. 1. For purpose of illustration, only home location 100-A in one country and one visiting location 100-B in another country are shown. In each location there is a Cell-phone Switching Center (CSC) 110-A and 110-B, respectively, which can be the switching centers of any of the existing cell-phone service providers. CSCs 110-A and 110-B are interconnected with Public Switched Telephone Network (PSTN) and other proprietary wireless cellular networks 130 via communication links 150-A and 150-B, respectively. For purpose of illustration, a single roaming wireless phone 180 is shown. Phone 180 is coupled to CSC 110-B via wireless mobile radio channel 181.

Figure 2:
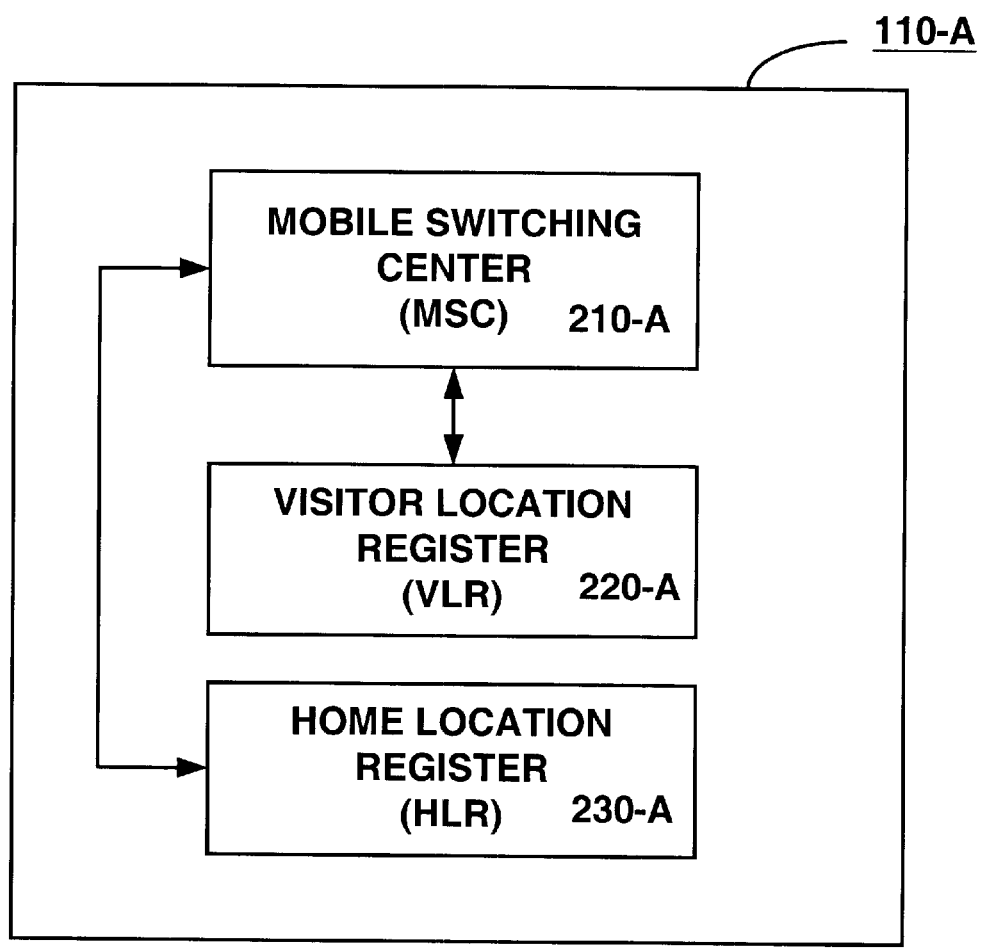
FIG. 2 is a high-level block circuit diagram of the cell-phone switching center of FIG. 1.

Referring next to FIG. 2, a high-level block diagram of cell-phone switching center CSC 110-A (respectively, CSC 110-B) is shown. The components of FIG. 2 are conventional elements in GSM systems, and only those components in a CSC that are relevant to this invention as described later are shown in FIG. 2. Mobile Switching Center (MSC) 210-A (respectively, MSA 210-B) manages routing and switching of calls from and to a cell-phone, and couples directly to link 150-A (respectively, link 150-B). Visitor Location Register (VLR) 220-A (respectively, 220-B) is a database containing information about cell-phones that are visiting the location areas under the coverage area of MSC 210-A (respectively, MSC 210-B). Home Location Register (HLR) 230-A (respectively, 230-B) is a database that maintains the current location information of cell-phones belonging to the home location. Both databases are accessible to MSC 210-A (respectively, 210-B). Every cell-phone has a home location and the MSC corresponding to the home location also contains account and authorization information for that cell-phone. For discussion purposes herein, it is assumed that the visiting location of cell-phone 180 is location 100-B of FIG. 1 and home location is 100-A. Thus, the visiting MSC 210-B is located in CSC 110-B and home MSC 210-A is located in CSC 110-A.

Figure 3:
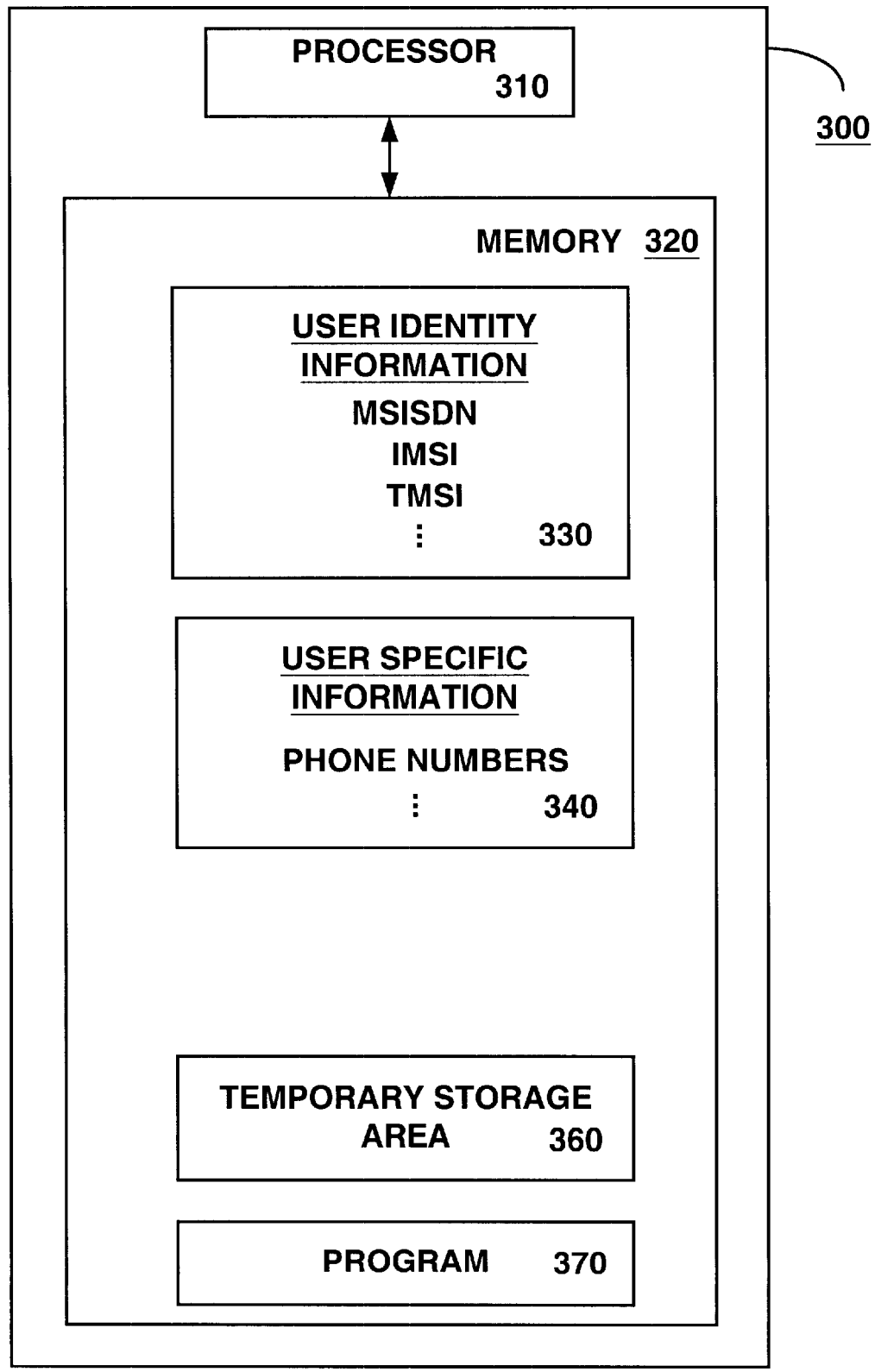
FIG. 3 illustrates a simplified representation of a SIM highlighting the components impacted by the present invention.

For the purpose of understanding the embodiments of this invention described shortly, a simplified representation of SIM 300 is shown in FIG. 3. Processor 310 handles all the SIM related functions and interactions with the communications processor of the cell-phone (i.e., the mobile equipment ME discussed earlier). Memory 320 contains data files and a program. The information stored in the files in conventional SIMs can be classified as user identity information 330 and user specific information 340. The user identity information is mainly composed of: (a) IMSI (International Mobile Subscriber Identity), which is an identifier unique to each SIM; (b) MSISDN (Mobile Subscriber Integrated Services Digital Network Number); and (c) TMSI (Temporary Mobile Subscriber Identity), all of which combine to uniquely identify a mobile phone within a GSM system. An MSISDN is the number dialled by any user— wireless or wire-based—to connect to a GSM subscriber such as cell-phone 180. A TMSI is generally used in a GSM system in place of IMSI after a cell-phone has been registered with a MSC using its IMSI. The user specific information 340 includes data stored by a user for his/her personal use. For example, phone numbers the user would like the phone to automatically call may be stored here. The temporary storage area 360 is a volatile type of memory for storing temporary information that is useful during the powered state of a cell-phone. When battery power to the cell-phone is switched off or SIM 300 is disconnected from the cell-phone, all information stored in this area 360 is erased, while the other parts of memory retain the information stored in them. Memory 320 also stores program 370, which includes instructions for controlling processor 310 in accordance with the requirements of the wireless communication system in which the phone is to operate. In modern SIMs both the data contents and the program in the memory can be modified through commands received by a cell-phone over the wireless communication channel such as channel 181.

Figure 4:
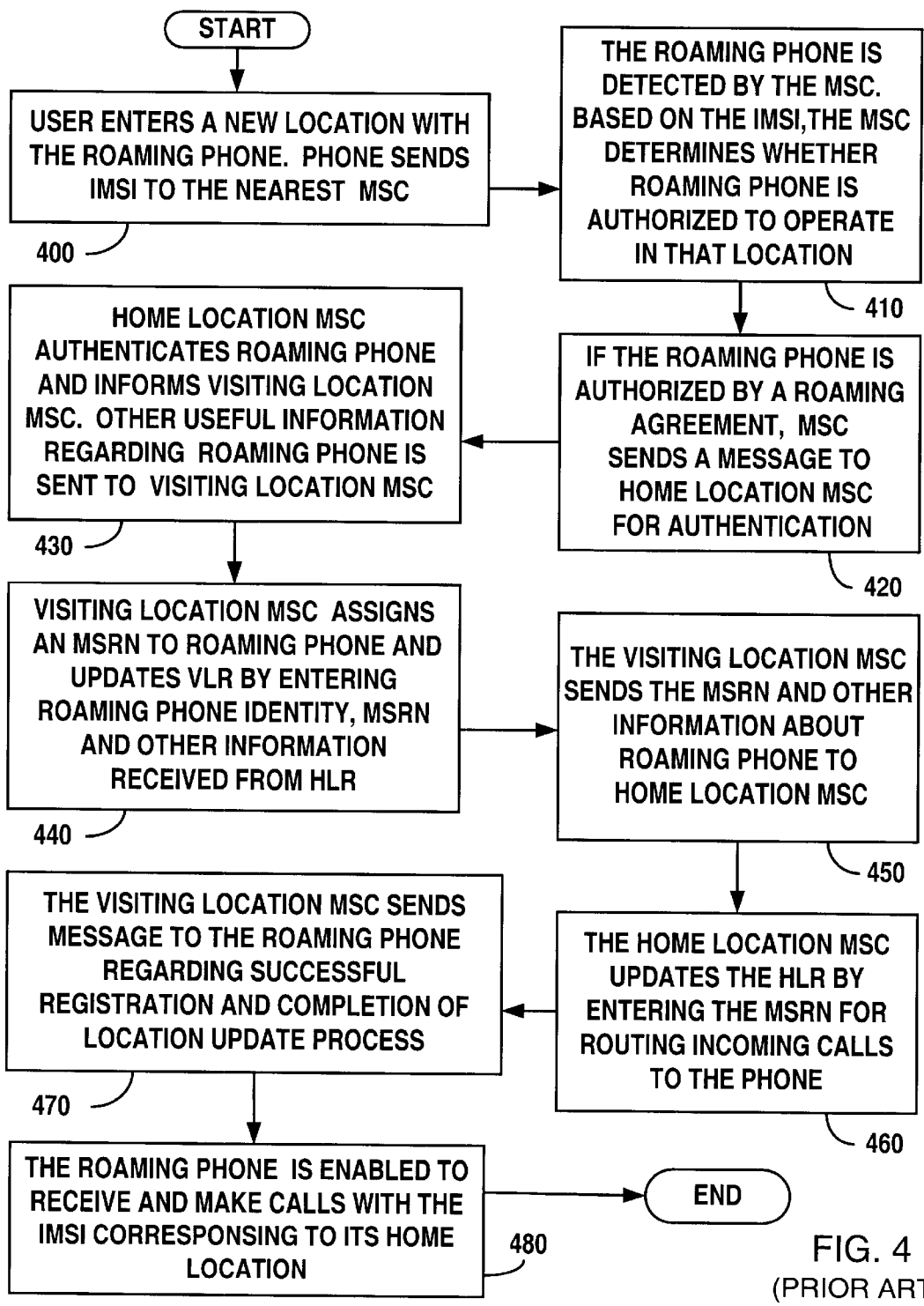
FIG. 4 is a flowchart depicting the registration and location update process to establish and maintain a call connection in a conventional GSM system.

Referring now to FIG. 4, a flowchart depicting the registration and location update process to establish and maintain a call connection in a conventional GSM system is shown, including the following processes:

Process 400: a user enters a new visiting location (e.g., 100-B) with roaming phone 180 'ON' by moving from location 100-A to 100-B or, alternatively, the user might switch roaming phone 180 'ON' while in new visiting location 100-B. Roaming phone 180 detects wireless transmissions from the nearest MSC (e.g., 210-B) and phone 180 responds by sending its identification information encapsulated within its IMSI.

Process 410: MSC 210-B thus detects roaming phone 180 from its IMSI. As the IMSI contains a country code and a network code, MSC 210-B can determine whether roaming phone 180 with that IMSI is allowed to operate under any existing roaming agreements with the home network (e.g., 110-A) service provider of phone 180—it is denied registration if there are no roaming agreements in effect at that time.

Process 420: if registration is supported, MSC 210-B sends a message to home location MSC 210-A of roaming phone 180 for authentication.

Process 430: home location MSC 210-A authenticates phone 180 based on information about roaming phone 180 stored in the databases of MSC 210-A. Home location MSC 210-A also sends other information that may be useful for the visiting location MSC 210-B for settling the call charges incurred by roaming phone 180 while roaming in the visiting location 100-B.

Process 440: visiting location MSC 210-B then assigns an MSRN (Mobile Station Roaming Number) to roaming phone 180 and updates VLR 220-B with the identity of roaming phone 180, the MSRN and other information about roaming phone 180.

Process 450: visiting location MSC 210-B sends the MSRN and other information about roaming phone 180 to home location MSC 210-A.

Process 460: home location MSC 210-A then updates HLR 230-A by entering the MSRN for routing incoming calls to phone 180.

Process 470: visiting location MSC 210-B sends a message to roaming phone 180 indicating successful registration and completion of the location update process.

Process 480: phone 180 is then enabled to receive and make calls with the IMSI used during registration as the basis for its identification.

This completes the registration and location update process as per a conventional GSM system.

It may be noted that in practice for reasons of security of IMSI, MSC 210-B generally assigns a TMSI for the duration of each call. The TMSI is transmitted to roaming phone 180 over wireless channel 181 instead of the IMSI to identify it. The IMSI used by roaming phone 180 for registration is useful for identifying the phone within MSC 210-B and for charging calls received and made by roaming phone 180 as per any billing plans in force. Generally, as the IMSI used by the roaming phone 180 is not a local number in visiting location 110-B, the call charges are higher than those incurred by phones that use local IMSIs. Keeping this in view, this invention relates to a method for providing a local IMSI to roaming phone 180, that is, providing an IMSI associated with location 110-B so the home location of phone 180 appears to be a local phone belonging to location 110-B instead of the actual location 110-A.

An outgoing call from roaming phone 180 is routed by visiting location MSC 210-B to the destination number through the PSTN and/or wireless cellular networks 130. In the case of an incoming call, the caller calls roaming phone 180 by its MSISDN number. The call first arrives at home location MSC 210-A as per the routing based on the MSISDN. MSC 210-A then refers to HLR 230-A and finds that roaming phone 180 is in a visiting location, namely 100-B for the above example, and hence routes the call to the MSRN stored in the HLR 230-A. The call then arrives at visiting location MSC 210-B based on the MSRN. MSC 210-B then identifies roaming phone 180 based on the IMSI or TMSI associated with the MSRN, and routes the call to roaming phone 180.

Global Roaming System and Method in Accordance with the Present Invention

Figure 5:
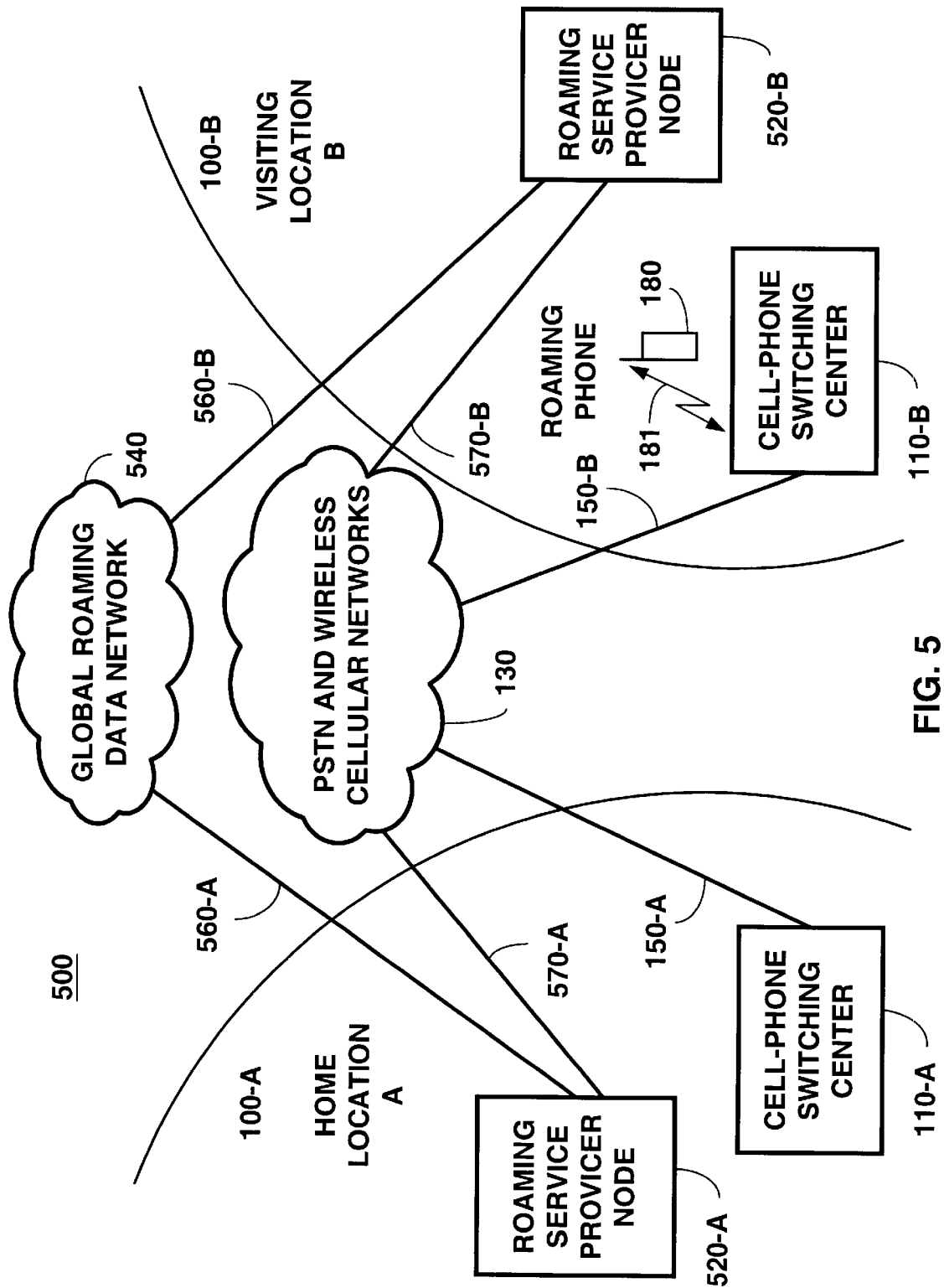
FIG. 5 is a high-level block diagram of a wireless global roaming system used to describe the principles of the present invention.

A high-level block diagram of a wireless global roaming GSM system 500 to elucidate the principles of the present invention is shown in FIG. 5; FIG. 5 depicts the components in accordance with the present invention shown in overlay fashion on FIG. 1. Accordingly, countries in which roaming service encompassed by the inventive subject matter are to be supported have one or more Roaming Service Provider Nodes (RSPNs)—again for illustration, only one home location RSPN 520-A and one visiting location RSPN 520-B are shown. RSPNs 520-A and 520-B are interconnected, respectively, by data communication links 560-A and 560-B to Global Roaming Data Network 540; network 540 is used to send messages between RSPNs as per the teachings of this invention to be discussed shortly. RSPNs 520-A and 520-B are also connected to the network "cloud" 130 via telephone communication links 570-A and 570-B, respectively. For purpose of illustration, again only a single roaming wireless phone 180 is shown.

To reiterate, conventional components include, as per FIG. 1, PSTN and Wireless Cellular Networks 130 and CSC's 110-A and 110-B. RSPNs 520-A and 520-B and Data Network 540 are elements overlaid on the conventional components in accordance with the present invention. By overlaying the RSPNs and Data Network on the conventional components, the operations of the conventional components are impacted, as will be discussed in the sequel. So, whereas the conventional components existed in a physical sense prior to the introduction of the inventive principles, the operational characteristics (e.g., programs executed by the conventional components) and memory allocation of these conventional components may now be affected by the overlaid RSPNs and the Data Network.

Figure 6:
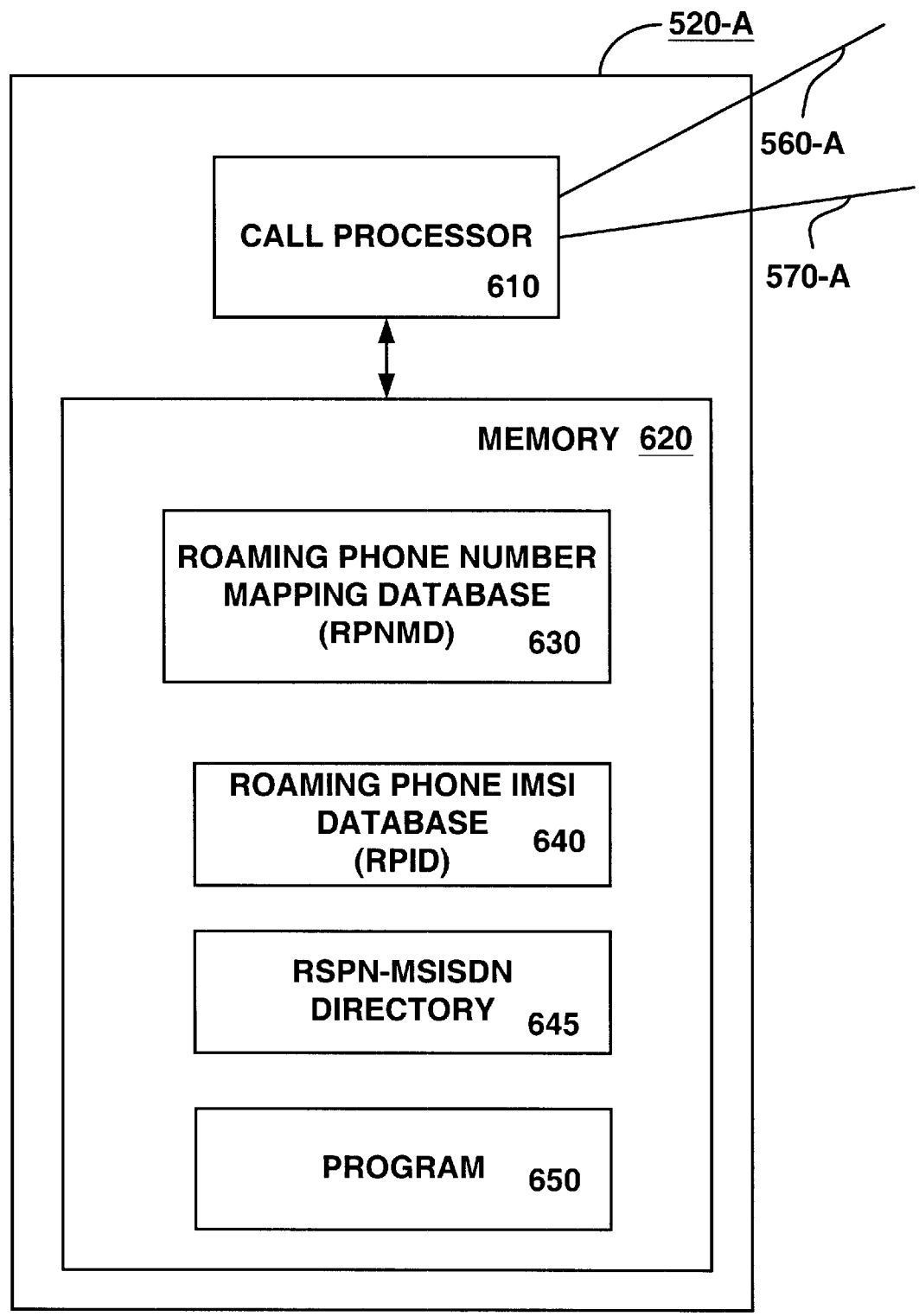
FIG. 6 is a schematic representation of a Roaming Service Provider Node of FIG. 5.

Referring next to FIG. 6, a schematic representation of an RSPN 520-A is shown (520-B is substantially the same). Call processor 610 handles all calls originating from or terminating at roaming cell-phones and terminates communication links 560-A and 570-A of FIG. 5. If a prepaid roaming service is implemented, call processor 610 also performs on-line prepaid account management and prepaid call management functions. Memory 620 contains databases and a program—only those databases that are relevant to this invention are shown in FIG. 6. Roaming Phone Number Mapping Database (RPNMD) 630 contains mapping tables for associating the home location number of a cell-phone to the cell-phone number assigned to the phone when it is roaming in a visiting network. Roaming Phone IMSI Database (RPID) 640 contains a list of International Mobile Subscriber Identity (IMSI) numbers that can be used temporarily by roaming mobile phones in the area served by the RSPN. The RSPN-MSISDN Directory 645 contains MSISDNs of the different RSPNs of the system. Memory 620 also stores a program 650, which includes instructions for controlling processor 610 in accordance with the present invention, and particularly in accordance with the process described in the sequel. Call processor 610 can access each portion of memory 620, namely, databases 630, 640, and 645, and program 650, as required.

Referring now to FIG. 7A, an embodiment of Roaming Phone Number Mapping Database (RPNMD) 630 is depicted in detail. Database 630 stores data relating to mapping of home location phone numbers to visiting location phone numbers and the corresponding RSPN identities. Each record (row) of database 630 represents a single roaming phone. For exemplary purposes, two records R1 and R2 are shown. Field 710 stores a Home Location Phone Number (HLPN). Callers to a cell-phone user (e.g. phone 180) under the roaming system of this invention identify that user through the HLPN. The HLPNs may be chosen to be toll-free (e.g., 1–800- . . . ) phone numbers in the home country/location of the user as toll-free numbers are generally easily available. The HLPN for each cell-phone is a physical number, but for purposes of the present invention also serves as a pointer to another physical phone number, which is now described with reference to field 720. Field 720 is used to store the home location MSISDN (Mobile Subscriber Integrated Services Digital Network Number). Recall an MSISDN is the number in the conventional GSM system that is dialled by any user—wireless or wirebased—to connect to a GSM subscriber such as cell-phone 180. Thus, prior to the introduction of the inventive principles, cell-phone 180 was dialled via its MSISDN number. Now, in accordance with the present invention, cell-phone 180 is dialled via its HLPN which then becomes a pointer to the MSISDN by table lookup in database 630. The MSISDN follows PSTN/ISDN numbering pattern given in CCITT recommendations E.164 and E.213. The MSISDN can be used as a global identifier to address the HLR, such as HLR 230-A. The IMSI corresponding to the MSISDN of field 720 is stored in field 730. The MSISDN and the IMSI have a one-to-one correspondence in a GSM wireless cellular network. Field 740 stores the MSISDN allocated to the cell-phone by the RSPN in the current location where the user is roaming. The current location MSISDN is used to route an incoming call to a cell-phone. To reiterate, in conventional systems, the MSISDN is used by a caller to a cell-phone, but, as per this invention, the HLPN is first used to reach an RSPN; the RSPN then connects the call to the called user by directly using the home location MSISDN, or by using the current location MSISDN via the current location RSPN. Field 750 stores the identity of the current location RSPN. A five digit RSPN identity number is shown for exemplary purposes. In practice any other code for identifying RSPNs may be used. The RSPN identity stored in this database represents the most recent RSPN handling the roaming phone as known to the home location RSPN. (It is to be noted that the rows and columns of the databases described herein represent records and fields thereof, respectively. In the described embodiments, the databases are used in a relational arrangement, as is known in the art, so that the databases relate to one another by way of fields that store common data. It is to be noted that while the following description refers to specific individual databases, formats, records, and fields, those skilled in the art will readily appreciate that various modifications and substitutions may be made thereto without departing from the spirit and scope of the present invention.)

The specific entries in Row R1 of database 630 are to be interpreted as follows. For purposes of this discussion, it is presumed that RSPN 520-A has the numerical identity 67890, as shown in the last column 750. Then, from entries in row R1, it is evident that phone 180 has a current location MSISDN (namely, 111-33-11223) that is the same as the home location MSISDN, so phone 180 is now located in location 100-A. The case of phone 180 migrating to location 100-B is discussed in the sequel to see how the entries in row R1 change over time.

Referring now to FIG. 8, an embodiment of RSPN-MSISDN Directory 645 is depicted. Each record (row) of directory 645 represents a single RSPN. For exemplary purposes, only three records R1, R2 and R3 are shown. Field 810 is used to store the RSPN identity. One or more MSISDNs assigned to the RSPN itself listed in field 810 are stored in field 820. These MSISDNs are useful in routing an incoming call from the home location RSPN to the visiting location RSPN.

Referring now to FIG. 9A, an embodiment of roaming phone IMSI database (RPID) 640 is depicted in detail. Database 640 stores data relating to the allocation of IMSIs and corresponding MSISDNs to roaming phones. Each record (row) of database 640 represents a single MSISDN-IMSI pair. For exemplary purposes, only two records R1 and R2 are shown. Fields 910 and 920 are used to store an MSISDN and the corresponding IMSI, respectively. The MSISDNs and IMSIs stored here represent local SIMs and they can be allocated to the visiting SIMs which can then take on the characteristics of local cell-phones in the visiting location. Field 930 is used to indicate whether an MSISDN/IMSI pair is free or allocated to a roaming phone. When an MSISDN-IMSI pair is allocated, then the home location MSISDN of the roaming phone to which the MSISDN/IMSI pair is allocated is stored in field 940. Otherwise, the field 940 is blank.

Figure 10:
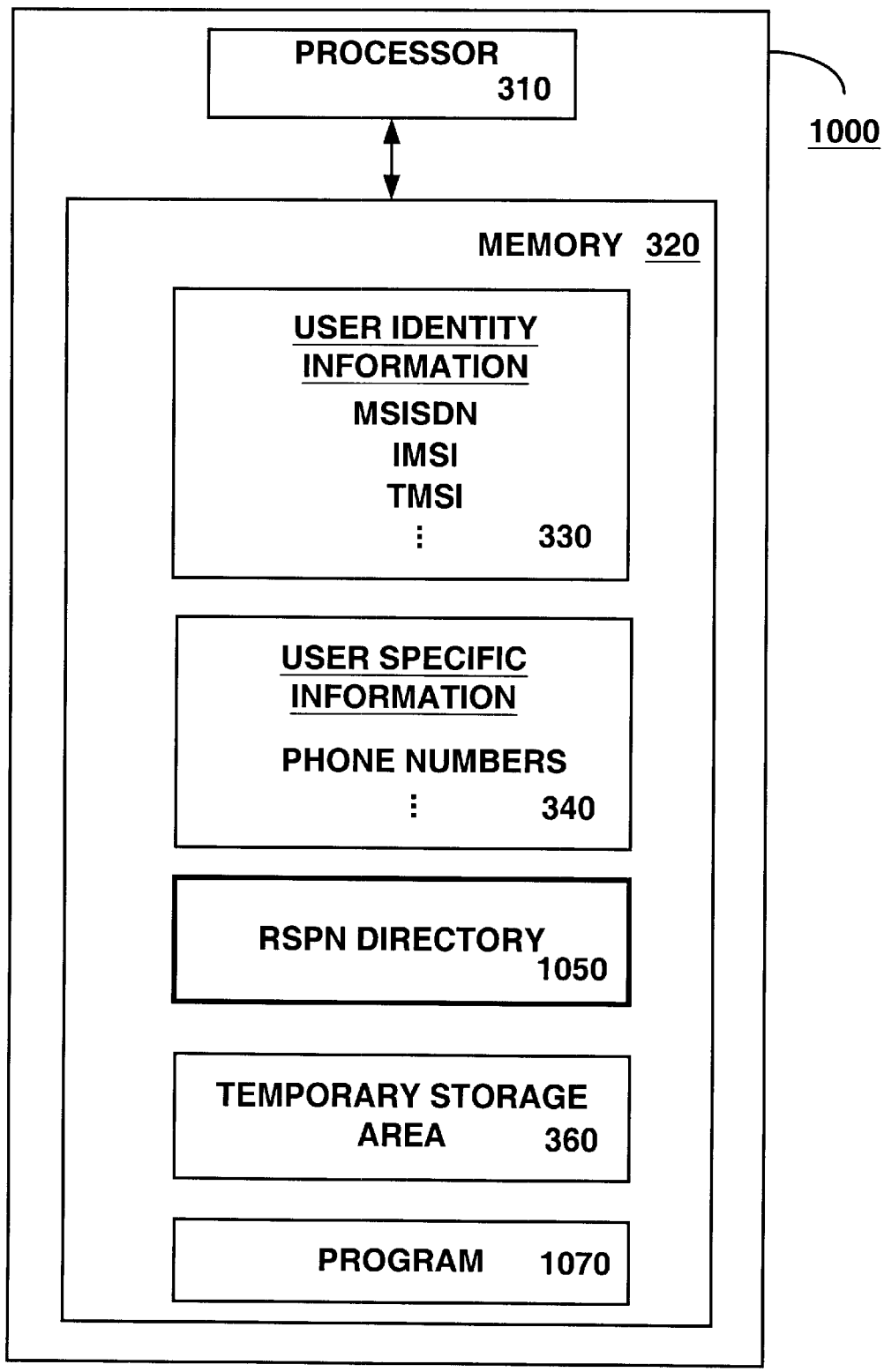
FIG. 10 is a simplified representation of a SIM depicting the additional component, namely, the Roaming Service Provider Node directory, in accordance with the present invention.

For the purpose of understanding the embodiments of this invention, a simplified representation of SIM 1000 is shown in FIG. 10; SIM 1000 of FIG. 10 is essentially the same as SIM 300 of FIG. 3 except memory 320 now is partitioned to include RSPN Directory 1050. RSPN Directory 1050 is used for storing the contact MSISDNs of RSPNs for use by phone 180 when it is in visiting locations. Moreover, program area 1070, which is a modified version of program 370 of FIG. 3, contains additional program steps to carry out the operation of the SIM in accordance with the present invention.

Referring now to FIG. 11, an embodiment of RSPN Directory 1050 is depicted. Directory 1050 stores MSISDNs to be used by roaming phones to contact RSPNs in the visiting location. Each record (row) of directory 1050 represents a single wireless cellular network. For exemplary purposes, only two records R1 and R2 are shown. Field 1110 is used to store the wireless network identity in terms of two sub-fields MCC 1120 and MNC 1130. MCC is the Mobile Country Code and MNC is the Mobile Network Code. Field 1140 is used to store one or more MSISDNs of the RSPN that can be contacted in the wireless network area identified by MCC and MNC. When a roaming phone finds that the MCC and MNC detected by it in the visiting location is different from the MCC and MNC of its current IMSI, it initiates a location update process with the nearest MSC, as will be detailed below. After registration with the nearest MSC, the roaming phone can use a corresponding MSISDN given in field 1140 to contact the applicable RSPN.

One embodiment of this invention is a method of dynamically modifying the contents of the SIM when a cell-phone is taken into a visiting location area so as to assume a local cell-phone status as long as it is roaming in the visiting location. A two-stage location updating procedure required for this SIM modification process in accordance with the teachings of the present invention is embodied in the flow-chart shown in FIG. 12. Using both the contents of databases and the configuration of FIG. 5 as discussed earlier, the process flow is as follows:

Process 1200: a cell-phone user enters a new visiting location with the roaming phone 'ON' or, alternatively, the user might switch 'ON' the roaming phone in a new visiting location. Roaming phone 180 detects conventional wireless transmissions from the nearest MSC, which for system 500 of FIG. 5 is presumed to be MSC 210-B, and phone 180 responds by transmitting its identification information in the form of its IMSI (from FIG. 7A, IMSI 222-33-12345678) to this nearest MSC 210-B via wireless channel 181.

Process 1210: MSC 210-B then detects roaming phone 180 and registers the phone by requesting an update of the HLR (e.g., with reference to FIG. 2, HLR 230-A) with the current location 100-B of phone 180, and registering phone 180 identification information in the VLR of MSC 210-B (e.g., VLR 220-B), including the home location IMSI 222-33-12345678.

Process 1220: from the information, including the country code MCC and network code MNC of FIG. 11, conventionally transmitted by MSC 210-B over its wireless channels, roaming phone 180 finds a contact number of the RSPN in the visiting area, namely RSPN 520-B, by cross-referencing RSPN directory 1050 using the received MCC and MNC. It is supposed that the MCC and MNC received by phone 180 are those shown in row R1 of FIG. 11; it is further supposed that the MSISDN selected is 555-44-12345 from the two possible paths to communicate with RSPN 520-B. The identity of RSPN 520-B is 12345, as per row R1 of FIG. 8. Phone 180 then sends a conventional Short Message Service (SMS) message to RSPN 520-B, via wireless link 181, MSC 210-B, link 150-B, network cloud 130, and link 570-B, indicating the home location MSISDN of phone 180 (from FIG. 7A, 111-33-11223) and other information such as the RSPN identity of the home location RSPN, namely, RSPN 520-A having, for example, identity 67890 as listed in FIG. 8. Alternatively, the SMS message may be received directly by RSPN 520-B via MSC 210-B and the wireless medium. The purpose of the SMS message is to request issuance of a local IMSI and MSISDN by RSPN 520-B. Presuming FIG. 9A is associated with RSPN 520-B, the availability of local IMSI-MSISDN pairs is listed in RPID database 640 (there is a corresponding database like 640 in RSPN 520-A to handle visiting phones in location 100-A). Rows R1 and R2 are free; for exemplary purposes, R1 is selected as the pair so the local IMSI is 122-33-12345678 and the local MSISDN is 333-44-55555.

Process 1230: RSPN 520-B then sends the local IMSI (122-33-12345678) to roaming phone 180 as an Executable Short Message Service (ESMS) message via the path composing link 570-B, network cloud 130, link 150-B, MSC 210-B and wireless link 181. Other relevant information such as the RSPN identity (12345) of RSPN 520-B and any small programs executable by SIM 300 in roaming phone 180, as modified for this invention, may also be sent in the ESMS message.

Process 1240: Phone 180 stores the IMSI (122-33-12345678) sent by RSPN 520-B in Temporary Storage Area 360 in the memory 320 of its SIM 300. (By way of reiteration, as this IMSI is stored in volatile temporary storage area 360, it provides protection against it being copied by taking out the SIM card from the cell-phone. The protection against IMSI copying is possible because if the SIM card is taken out of the cell-phone, the IMSI data stored in the temporary storage area 360 is lost).

Process 1240: With IMSI 122-33-12345678 received from RSPN 520-B, phone 180 then sends a second location update request to MSC 210-B with which it had earlier registered.

Process 1250: MSC 210-B performs a fresh location update process with the newly assigned local IMSI and thereby enables roaming phone 180 to operate with the new local IMSI 122-33-12345678.

Process 1260: Phone 180 informs RSPN 520-B via an SMS message that successful registration with the new local IMSI 122-33-12345678 has been completed.

Process 1270: RSPN 520-B then updates its RPID database 640 as shown in FIG. 9B by marking the IMSI-MSISDN pair as 'allocated' and by entering the home location MSISDN (111-33-11223) of roaming phone 180 into field 940 of row R1.

Process 1280: RSPN 520-B sends the home location MSISDN (111-33-11223) and the newly allocated MSISDN (333-44-55555) to home location RSPN 520-A of the phone 180 via link 560-B, Global Roaming Data Network 140, and link 560-A. In this communication, the new RSPN identity (12345 of RSPN 520-B) is also sent to the home location RSPN 520-A.

Process 1290: Home location RSPN 520-A updates its RPNMD 630 by entering the newly allocated MSISDN (333-44-55555) in the Current Location MSISDN field (740) and the new RSPN identity (12345) in the RSPN Identity field (750)—this updating is depicted in FIG. 7B. If there was an earlier RSPN, other than home RSPN 520-A for roaming phone 180 as found by an entry in field 750, home location RSPN 520-A sends a message, via the Global Roaming Data Network 540 and link 560-A and the link to the earlier RSPN from Network 140, to de-allocate the local IMSI as allocated by the earlier RSPN to the roaming phone 180.

This completes the location update and registration process for roaming phone 180. It may be noted that after the second registration of the phone with MSC 210-B, the earlier registration with home location IMSI is cleared by MSC 210-B after a certain time-out period.

In the above description and in the rest of the following descriptions, only the IMSI is used as representative information required to make the phone behave as a local phone. As clear to one of ordinary skill in the art, other information is also required by a cell-phone to behave as a local phone in a visiting location. For example, in the GSM system, a secret key called 'Ki' (Individual Subscriber Authentication Key) is also required to be sent by an RSPN along with a local IMSI. The secret key 'Ki' is stored by the cell-phone in the temporary storage area 360 in SIM. The key 'Ki' is used by the cell-phone to for authenticating its identity to an MSC. For the purpose of simplicity in this description, the transmission of 'Ki' from RSPN to a cell-phone via an ESMS and later use during normal operation are not explicitly described.

Figure 12:
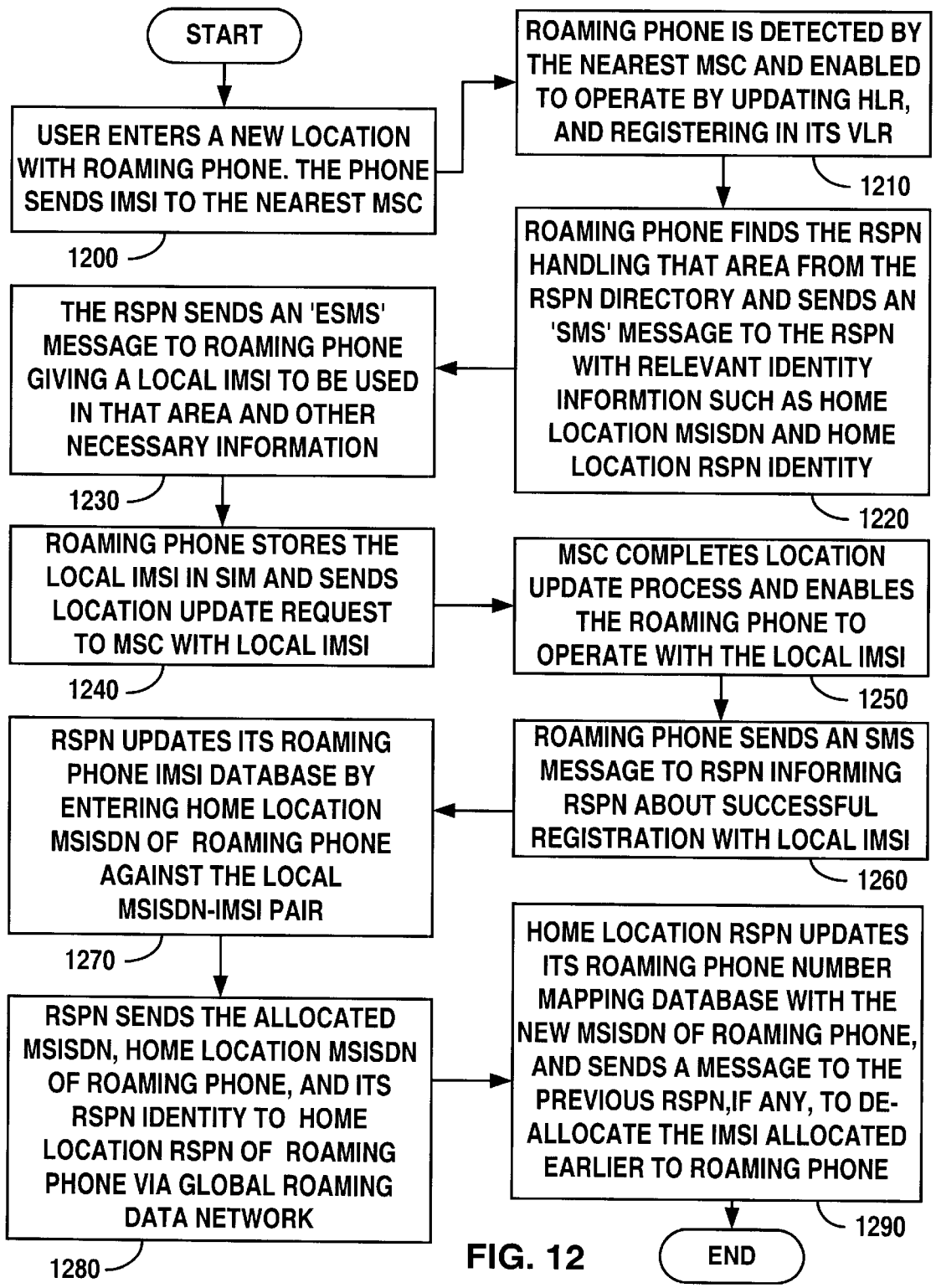
FIG. 12 is a flow diagram of the process of the present invention to register the roaming phone as a local phone in a visiting location.

With the location update process described with respect to FIG. 12, a roaming phone gets the status of a local phone in the visiting location without physically changing the SIM.

All outgoing calls from the roaming phone are routed and completed just as in any existing GSM wireless network.

However, an incoming call to roaming phone 180 is routed via the RSPN 520-A in the home location of the phone as follows. A caller to a roaming phone places a call to the phone at its Home Location Phone Number 710. The call is routed through PSTN and Wireless Cellular Networks 130 to the home location RSPN 520-A of the roaming phone. RSPN 520-A then looks up the roaming phone number mapping database (RPNMD) 630 and checks to find the RSPN location of the roaming phone (RSPN 520-B) and the MSISDN (333-44-55555) at which the roaming phone can be reached. This can be accomplished by comparing the Home Location MSISDN field 720 and Current Location MSISDN field 740 in RPNMD 630. If fields 720 and 740 are the same, then the roaming phone is in home location and so RSPN 520-A routes the call to the phone at its home location MSISDN (111-33-11223) found in field 720. Otherwise, if fields 720 and 740 are different, then the roaming phone is in a visiting location and its MSISDN (333-44-55555) is found in field 740. RSPN 520-A then routes the call to the current location MSISDN found in field 740 via link 570-A, PSTN and Wireless Cellular Networks 130, link 150-B, and MSC 210-B of CSC 110-B in the visiting location 100-B. Once the re-directed call is received by MSC 210-B, a talking path between the caller and the user of phone 180 over wireless channel 181 is established as per conventional call connection procedures.

Flow Diagram for Processing of Program 1070 in SIM 1000

Figure 13:
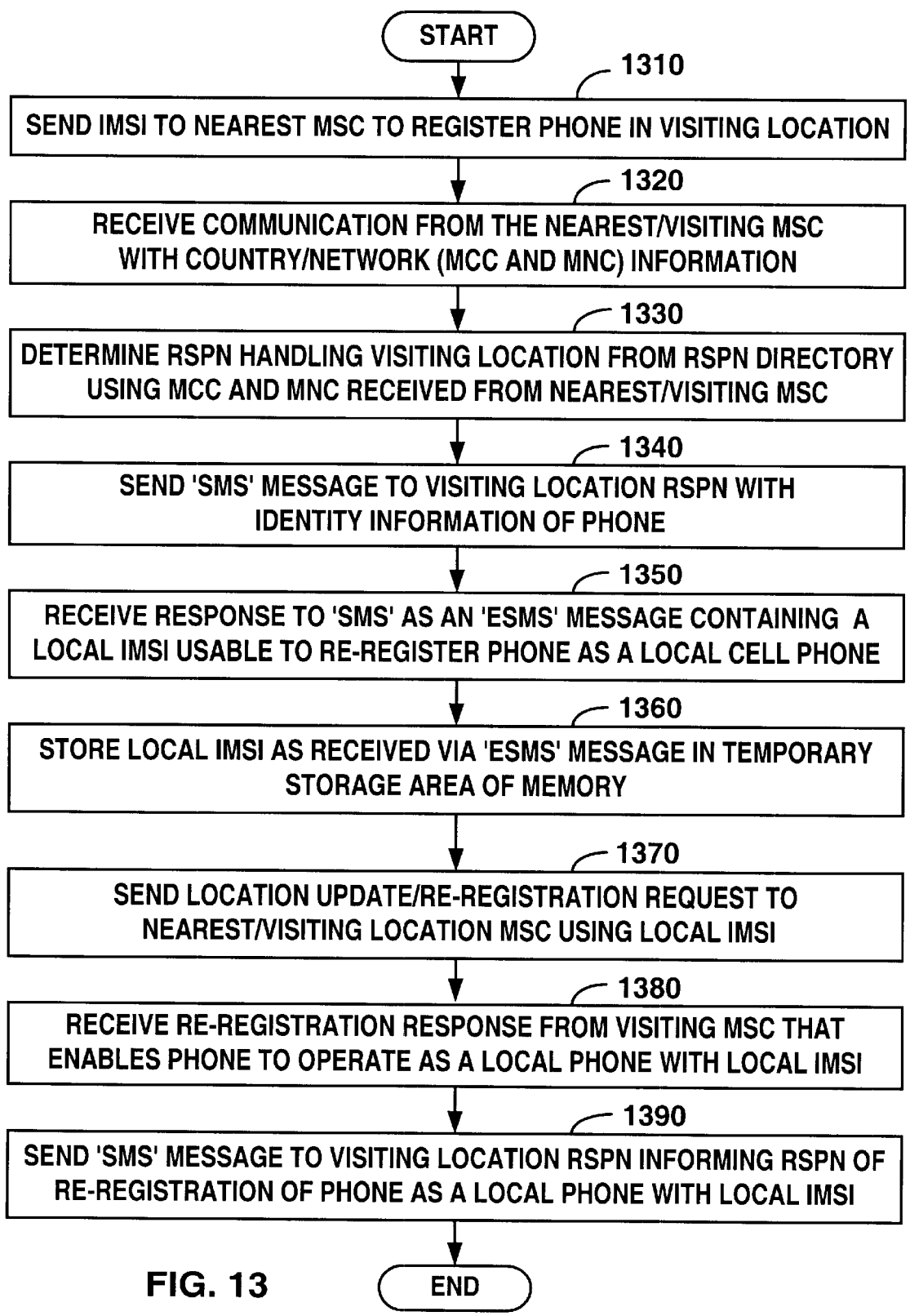
FIG. 13 depicts a flow diagram of the processing effected by the SIM.

The processes carried out by program 1070 in SIM 1000 that are relevant to the methodology of the present invention are shown in FIG. 13, as are described as follows all from the viewpoint of processes initiated or received by phone 180:

Process 1310: sends its home IMSI (222-33-12345678) information to the nearest MSC (MSC 210-B) to register the phone in the visiting location (100-B). The nearest MSC thus becomes the visiting location MSC.

Process 1320: receives as a response a communication from the nearest/visiting MSC with the Country/Network (i.e., MCC and MNC) information.

Process 1330: determines the RSPN (520-B) handling the visiting location using RSPN directory 1050 with reference to the MCC and MNC information.

Process 1340: sends an 'SMS' message to the visiting location RSPN with identity information of phone 180, such as home location MSISDN (111-33-11223) and home location RSPN 520-A identity (67890).

Process 1350: receives a response to 'SMS' as an 'ESMS' message which contains a local IMSI (122-33-12345678) usable to re-register phone 180 as a local cell-phone.

Process 1360: stores local IMSI as received via 'ESMS' message in temporary storage area 360.

Process 1370: sends a location update request in the form of a re-registration request to the visiting MSC using local IMSI.

Process 1380: receives a re-registration response from the visiting MSC that enables phone 180 to operate as a local phone with the local IMSI.

Process 1390: sends a 'SMS' message to the visiting location RSPN informing this RSPN of the successful re-registration of the phone as a local phone with the local IMSI.

Flow Diagram for Processes of Program 650 in RSPN 520

Figure 14:
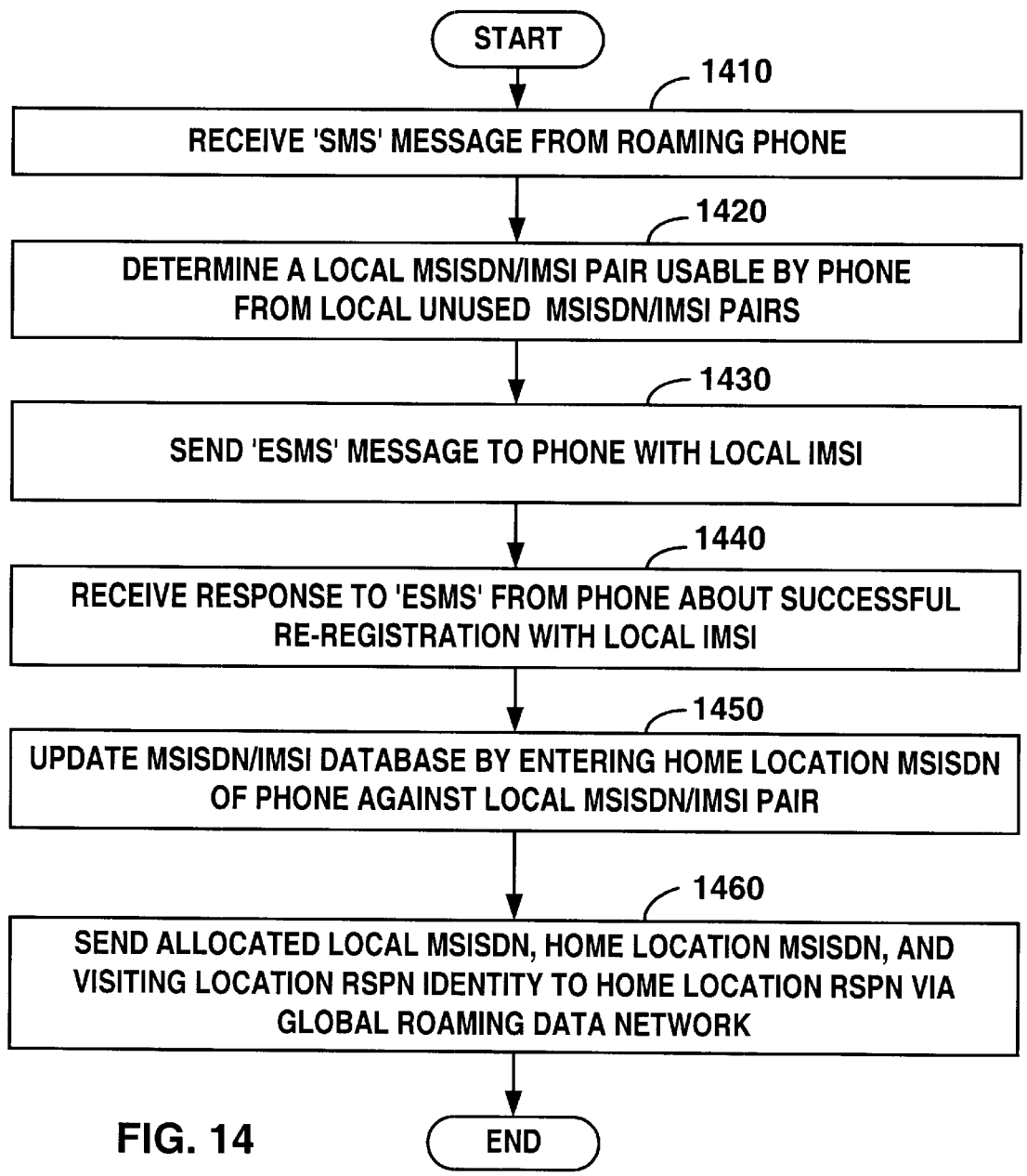
FIG. 14 depicts a flow diagram of the processing effected by the Roaming Service Provider Node.

The processes carried out by program 650 in RSPN 520 that are relevant to the methodology of the present invention are shown in FIG. 14, as are described as follows all from the viewpoint of processes initiated or received by RSPN 520:

Process 1410: receives 'SMS' message sent from phone 180.

Process 1420: determines an unused, local MSISDN/IMSI pair from RPID database 640.

Process 1430: sends an 'ESMS' message to phone 180 with local IMSI (122-33-12345678).

Process 1440: receives a response to 'ESMS' from phone 180 informing the visiting location RSPN (520-B) about the successful re-registration of the roaming phone with the local IMSI.

Process 1450: updates MSISDN/IMSI database 640 by entering home location IMSI (111-33-11223) and "allocated" entry in database 640.

Process 1460: sends the allocated, local MSISDN (333-44-55555), home location IMSI, and identity of the visiting location RSPN (520-B) to the home location RSPN (520-A) via the Global Roaming Data Network (540).

Handoff Processing

It is possible in practice that roaming phone 180 is taken from one network location to another while a call is in progress. In the conventional GSM system, the handoff of the phone from one MSC to another MSC takes place without interruption of the call. However, as per the teachings of this invention, a second location update with a local IMSI is required. The handoff process could lead to an on-going call being interrupted. So to avoid this call interruption for a call in progress, roaming phone 180 delays contacting the next RSPN in a second visiting location until the on-going call is completed.

Figure 15:
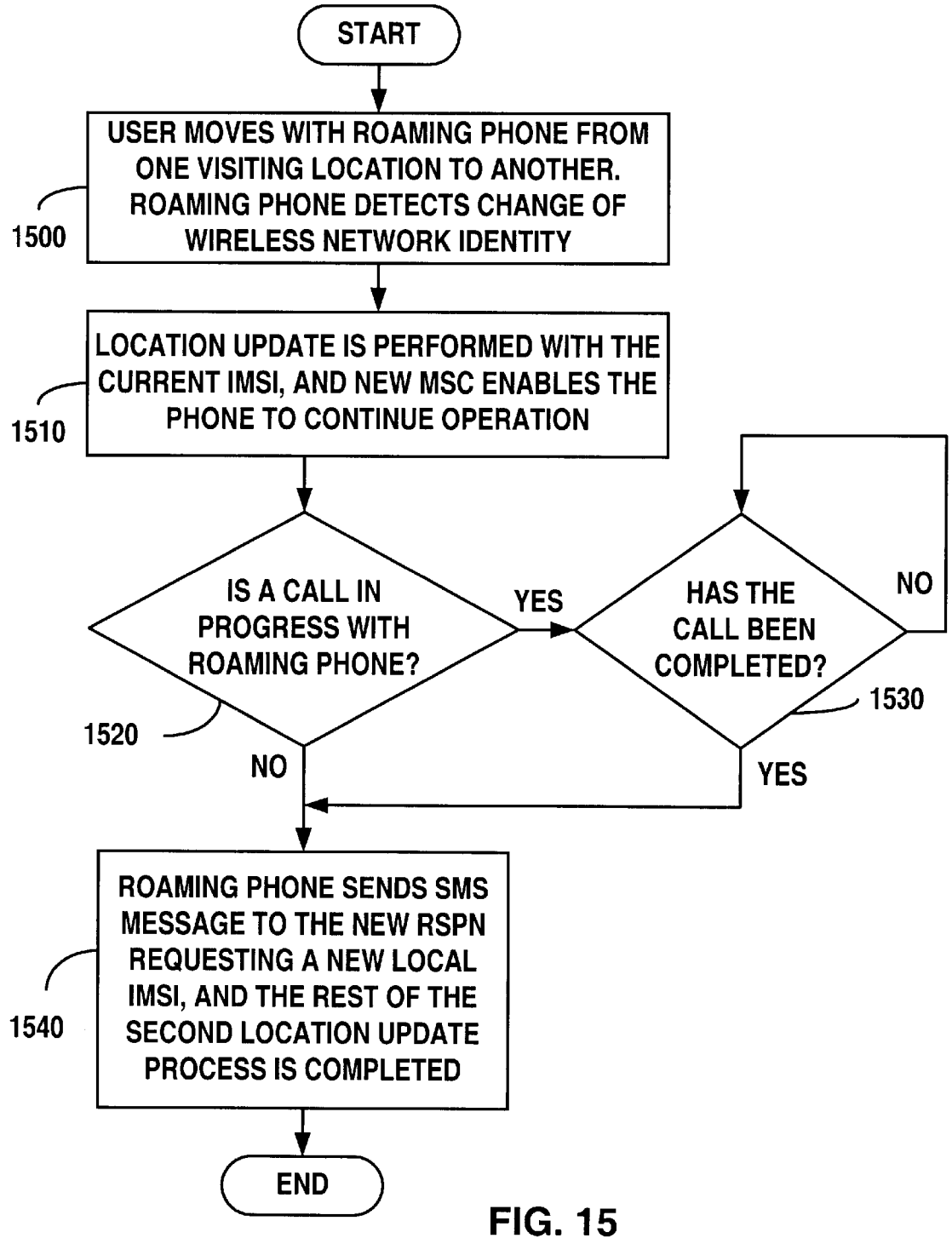
FIG. 15 depicts a flow diagram to handle handoff.

A flowchart depicting this handoff aspect of the present invention is shown in FIG. 15. Referring to this figure, the process is as follows:

Process 1500: roaming phone 180 is moved across the handoff region between wireless coverage areas of two MSCs each with a separate RSPN in each region. The roaming phone detects a change in location by finding a different wireless network identity (MCC and MNC) received by it from the new MSC.

Process 1510: the roaming phone then initiates a location update with the new MSC using its current IMSI, and the new MSC enables the phone to continue operation with that IMSI.

Process 1520: before sending an SMS message to the new RSPN corresponding to the new MCC and MNC, the roaming phone checks if there is a call in progress.

Process 1530: if a call is in progress, then the roaming phone waits until the call is completed. During this waiting period, as the IMSI used is not local to the new network area, it is anticipated that a slightly higher call charge might be incurred just for the call in progress.

Process 1540: if there is no call in progress during the handoff of the roaming phone, or after the call in progress is completed, the roaming phone sends an SMS message to the new RSPN requesting a new local IMSI and the rest of the second location update process is completed as per Processses 1230–1290 in the flowchart shown in FIG. 12.

In another embodiment of this invention, outgoing and incoming calls are routed through the RSPNs so that the calls can be monitored for their duration, and prepaid accounts of roaming subscribers can be decremented. For this purpose, the following procedure for outgoing and incoming calls is as follows.

When a roaming phone user places a call, the cell-phone calls up the current RSPN with which it is associated and sends the destination phone number as a parameter. This can be done through ATP (Access Transport Parameter) of SS7 (Signaling System 7) in existing systems. The roaming phone finds the MSISDN of the RSPN to be called in field 1140 of RSPN Directory 1050. The RSPN then routes the call to the destination number via a metering switch to monitor the call duration and permit the call against the prepaid account of the roaming subscriber.

In the case of an incoming call, callers to a roaming phone place a call to the phone at its Home Location Phone Number 710. The call is routed through PSTN and Wireless Cellular Networks 130 to the home location RSPN 520-A of the roaming phone. The RSPN 520-A of the roaming phone then looks up the roaming phone number mapping database (RPNMD) 630 and finds the location at which roaming phone can be reached by comparing the MSISDNs in fields 720 and 740. If the MSISDNs in fields 720 and 740 are the same, the roaming phone is in the home location, and so the RSPN 520-A routes the call to the phone at its home location MSISDN (found in field 720) via a metering switch to monitor the call duration and permit the call against the prepaid account of the roaming subscriber. Otherwise, if the MSISDNs in fields 720 and 740 are different, then the roaming phone is in a visiting location, and so the call is routed to the current visiting location RSPN 520-B. An MSISDN at which the call can be routed to the current location RSPN 520-B is found using the RSPN identity found in field 750 and the RSPN-MSISDN directory 800. The home location RSPN 520-A also sends MSISDN of the roaming phone (found in field 740) to the visiting location RSPN 520-B. The visiting location RSPN 520-B then routes the call to the roaming phone at its current MSISDN via a metering switch to monitor the call duration and permit the call against the prepaid account of the roaming subscriber.

It may be noted that, in the above cases of calls permitted against prepaid accounts, when the roaming phone first registers with the visitor location RSPN 520-B, the prepaid account information about the phone is obtained by the RSPN 520-B from the home location RSPN 520-A.

Although the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for operating a cell-phone roaming from its home location served by a home location cell-phone switching center to a visiting location served by a visiting location cell-phone switching center distinct from the home location cell-phone switching center, the method operating in a system including a visiting location roaming service provider node servicing the visiting location cell-phone switching center, the visiting location roaming service provider node including a database containing the local identifier number assigned to the roaming cell-phone while in the visiting location, the method comprising registering the cell-phone with the visiting location cell-phone switching center as a roaming cell-phone using cell-phone identification information originally assigned to the cell-phone, and re-registering the cell-phone with the visiting location cell-phone switching center as a local cell-phone using a local identifier number assigned to the cell-phone in place of the original cell-phone information while in the visiting location, wherein the re-registering includes communicating roaming-related information identifying the roaming cell-phone from the roaming cell-phone to the visiting location roaming service provider node, and sending the local identifier number, determined by the visiting location service provider node with reference to the roaming-related information, from the visiting location roaming service provider node to the roaming cell-phone via the visiting location cell-phone switching center to dynamically configure the roaming cell-phone with the local identifier number to thereby convert the roaming cell-phone to a local cell-phone in the visiting location.

2. A method for operating a cell-phone roaming from its home location served by a home location cell-phone switching center to a visiting location served by a visiting location cell-phone switching center distinct from the home location cell-phone switching center, the method operating in a system including a visiting location roaming service provider node serving the visiting location cell-phone switching center, the visiting location roaming service provider node including a database containing a set of local IMSIs, one of the local IMSIs being assigned to the roaming cell-phone while in the visiting location, the method comprising registering the cell-phone with the visiting location cell-phone switching center as a roaming cell-phone using the International Subscriber Mobile Identity (IMSI) permanently assigned to the cell-phone, and re-registering the cell-phone with the visiting location cell-phone switching center as a local cell-phone using a local IMSI assigned to the cell-phone while in the visiting location, wherein the re-registering includes communicating roaming-related information identifying the roaming cell-phone from the roaming cell-phone to the visiting location roaming service provider node, and sending the one of the local IMSIs, determined by the visiting location service provider node with reference to the roaming-related information, from the visiting location roaming service provider node to the roaming cell-phone via the visiting location cell-phone switching center to dynamically configure the roaming cell-phone with the one of the local IMSIs to thereby convert the roaming cell-phone to a local cell-phone in the visiting location.

3. A method for operating a cell-phone in a system, the system including a home location cell-phone switching center, a visiting location cell-phone switching center distinct from the home location cell-phone switching center, and a visiting location roaming service provider node to service the visiting location cell-phone switching center, the visiting location roaming service provider node including a database containing a local identifier number allocated to the visiting location and assignable to the roaming cell-phone while in the visiting location, wherein the cell-phone roams from the home location served by the home location cell-phone switching center to the visiting location served by the visiting location cell-phone switching center, the method comprising registering the cell-phone with the visiting location cell-phone switching center using cell-phone identification information including an original identifier number, communicating roaming-related information identifying the roaming cell-phone from the roaming cell-phone to the visiting location roaming service provider node, sending the local identifier number, determined by the visiting location service provider node with reference to the roaming-related information, from the visiting location roaming service provider node to the roaming cell-phone via the visiting location cell-phone switching center, and re-registering the cell-phone with the visiting location cell-phone switching center with the local identifier number to thereby convert the roaming cell-phone to a local cell-phone in the visiting location.

4. A method for operating a cell-phone in a system, the system including: a home location cell-phone switching center; a visiting location cell-phone switching center distinct from the home location cell-phone switching center; a home location roaming service provider node to provide service to the home location cell-phone switching center; and a visiting location roaming service provider node to service the visiting location cell-phone switching center; and a global data network coupling each of the service provider nodes, the visiting location roaming service provider node including a database containing a local International Mobile Subscriber Identity number (IMSI) allocated to the visiting location and assignable to the roaming cell-phone while in the visiting location, wherein the cell-phone roams from the home location served by the home location cell-phone switching center to the visiting location served by the visiting location cell-phone switching center, the method comprising sending a first location update request from the cell-phone to the visiting location cell-phone switching center using a home location IMSI originally assigned to the cell-phone, updating a home location register in the home location cell-phone switching center with the visiting location of the cell-phone with reference to the home location IMSI of the cell-phone, updating a visiting location register in the visiting location cell-phone switching center using the home location IMSI of the cell-phone, identifying the visiting location roaming service provider node from information stored in the cell-phone, sending a short message service (SMS) message from the cell-phone to the visiting location roaming service provider node to request assignment of the local IMSI, sending the local IMSI as an Executable Short Message Service (ESMS) from the visiting location roaming service provider node to the cell-phone, storing the local IMSI in the cell-phone, sending a second location update request to the visiting location cell-phone switching center using the local IMSI, and updating the visiting location register using the local IMSI to thereby enable the cell-phone to operate with the local IMSI.

5. The method as recited in claim 4 further comprising sending another SMS message from the cell-phone to the visiting location service provider node to register successful completion of the second update, sending a Mobile Subscriber Integrated Services Digital Network (MSISDN) number associated with the local IMSI to the home location roaming service provider node via the global data network, and storing the MSISDN in the home location roaming service provider node to enable a call path upon initiation of a phone call to the cell-phone.

6. The method as recited in claim 5 further comprising assigning a home location phone number (HLPN) serving as a pointer to the MSISDN number associated with the local IMSI and storing the HLPN in the home location roaming service provider node, the HLPN being the global telephone number for calls to the cell-phone.

7. A method for registering a roaming cell-phone as a local cell-phone comprising identifying a roaming service provider node serving the roaming cell-phone, sending to the roaming service provider node from the roaming phone a message containing cell-phone identification information about the roaming phone, transmitting to the roaming phone from the roaming service provider node a response message containing a local number for establishing a call between the roaming phone and a visiting location mobile switching center, communicating the local number to the visiting location mobile switching center from the roaming phone, and enabling the roaming phone to operate as a local cell-phone in the visiting location with the local number.

8. A method for registering a roaming cell-phone as a local cell-phone comprising transmitting cell-phone identification information from the roaming phone to a visiting location mobile switching center over a wireless channel, enabling the roaming phone to communicate with the visiting location mobile switching center, identifying a roaming service provider node serving the visiting location mobile switching center, sending to the roaming service provider node from the roaming phone a message containing cell-phone identification information about the roaming phone, transmitting to the roaming phone from the roaming service provider node a response message containing a local number for establishing a call between the roaming phone and the visiting location mobile switching center, communicating the local number to the visiting location mobile switching center from the roaming phone, enabling the roaming phone to operate as a local cell-phone in the visiting location with the local number, sending a message to the roaming service provider node to inform the roaming service provider node that the roaming phone is registered as a local cell-phone, updating the roaming service provider node with a connection number corresponding to the local number, sending the connection number to the home location of the roaming phone via a global roaming data network, and storing the connection number in the home location for accessing the roaming phone.

9. A method for registering a roaming cell-phone as a local cell-phone comprising the steps of transmitting cell-phone identification information from the roaming phone to a visiting location mobile switching center over a wireless channel, enabling the roaming phone to communicate with the visiting location mobile switching center, identifying a roaming service provider node serving the visiting location mobile switching center, sending to the roaming service provider node from the roaming phone a message containing cell-phone identification information about the roaming phone, transmitting to the roaming phone from the roaming service provider node a response message containing a local number for establishing a call between the roaming phone and the visiting location mobile switching center, communicating the local number to the visiting location mobile switching center from the roaming phone, enabling the roaming phone to operate as a local cell-phone in the visiting location with the local number, sending a message to the roaming service provider node to inform the roaming service provider node that the roaming phone is registered as a local cell-phone, updating the roaming service provider node with a connection number corresponding to the local number, sending the connection number to the home location of the roaming phone via a global roaming data network, and storing the connection number in the home location for accessing the roaming phone.

10. A method for establishing a call connection to a roaming cell-phone in a visiting location comprising transmitting cell-phone identification information from the roaming phone to a visiting location mobile switching center over a wireless channel, enabling the roaming phone to communicate with the visiting location mobile switching center, identifying a roaming service provider node serving the visiting location mobile switching center, sending to the roaming service provider node from the roaming phone a message containing cell-phone identification information about the roaming phone, transmitting to the roaming phone from the roaming service provider node a response message containing a local number for establishing a call between the roaming phone and the visiting location mobile switching center, communicating the local number to the visiting location mobile switching center from the roaming phone, enabling the roaming phone to operate as a local cell-phone in the visiting location with the local number, sending a message to the roaming service provider node to inform the roaming service provider node that the roaming phone is registered as a local cell-phone, updating the roaming service provider node with a connection number corresponding to the local number, sending the connection number to the home location of the roaming phone via a global roaming data network, storing the connection number in the home location for accessing the roaming phone, and establishing the call connection using the connection number.

11. A method for registering a roaming phone as a local phone in a roaming area comprising sending identification information about the roaming phone from the roaming phone to a visiting mobile switching center to register the roaming phone, receiving from the visiting mobile switching center a communication containing an acknowledgement of registration with the visiting mobile switching center and location information about the roaming area, determining a roaming service provider node from the location information, sending a request message to the roaming service provider node with the identification information about the roaming phone, receiving a response message containing a local number to re-register the roaming phone as a local cell-phone and storing the local number, sending the local number to the visiting mobile switching center to re-register the roaming phone as a local cell-phone, receiving a re-registration acknowledgement from the visiting mobile switching center, and sending an information message to the roaming service provider node informing the roaming service provider node of successful registration of the roaming phone as a local phone with the local number.

12. The method as recited in claim 11 further including, after the second receiving, storing the local number and other secure information in a temporary storage area.

13. A method for managing the registration of a roaming phone as a local phone in a roaming area by a roaming service provider node comprising detecting a request message from the roaming phone containing identification information, determining a local connection number and a local number to re-register the roaming phone as a local phone, sending a response message to the roaming phone with the local number, receiving a return message from the roaming phone containing notification of successful re-registration of the roaming phone as a local cell-phone with the local number, marking the local connection number and local number as allocated, and sending the local connection number, the identification information, and an identifier of the roaming service provider node to the home location of the roaming phone.

14. A system for registering a roaming phone as a local phone in a visiting location comprising a plurality of roaming service provider nodes, and a global roaming data network coupled to each of the service provider nodes, wherein each of the service provider nodes includes a component for detecting a request message from the roaming phone containing roaming phone identification information, a component for determining a local connection number and a local number to re-register the roaming phone as a local phone, a component for sending a response message to the roaming phone with the local number, a component for receiving a return message from the roaming phone containing notification of successful re-registration of the roaming phone as a local cell-phone with the local number, a component for marking the local connection number and local number as allocated, and a component for sending, via the global roaming data network, the local connection number, the roaming phone identification information, and an identifier of the one of the service provider nodes serving the roaming phone in the visiting location to another of the service provider nodes in the home location of the roaming phone.

15. A roaming cell-phone capable of being registered as a local phone in a visiting location served by a visiting mobile switching center and a visiting service provider node, the roaming cell-phone comprising a component for sending identification information about the roaming phone from the roaming phone to the visiting mobile switching center to register the roaming phone, a component for receiving from the visiting mobile switching center a communication containing an acknowledgement of registration with the visiting mobile switching center and location information about the roaming area, a component for determining the visiting roaming service provider node from the location information, a component for sending a request message to the roaming service provider node with the identification information about the roaming phone, a component for receiving a response message containing a local number to re-register the roaming phone as a local cell-phone, a component for sending the local number to the visiting mobile switching center to re-register the roaming phone as a local cell-phone, a component for receiving a re-registration acknowledgement from the visiting mobile switching center, and a component for sending an information message to the roaming service provider node informing the visiting roaming service provider node of successful registration of the roaming phone as a local phone with the local number.

* * * * *